United States Patent
Dubbeldam et al.

(10) Patent No.: US 8,646,347 B2
(45) Date of Patent: Feb. 11, 2014

(54) MODULAR SCANNER APPARATUS AND PROBE HOLDING APPARATUS FOR INSPECTION

(75) Inventors: Arthur J. Dubbeldam, Ardrossan (CA); Mark P. Dubbeldam, Ardrossan (CA); Paul E. Torstensen, Ardrossan (CA); Jason P. Wiebe, Edmonton (CA)

(73) Assignee: Jireh Industries Ltd., Ardrossan, Alberta (CA)

( * ) Notice: Subject to any disclaimer, the term of this patent is extended or adjusted under 35 U.S.C. 154(b) by 322 days.

(21) Appl. No.: 12/824,330

(22) Filed: Jun. 28, 2010

(65) Prior Publication Data

US 2010/0326220 A1 Dec. 30, 2010

Related U.S. Application Data

(60) Provisional application No. 61/220,652, filed on Jun. 26, 2009.

(51) Int. Cl.
*G01D 21/00* (2006.01)

(52) U.S. Cl.
USPC ........................ 73/866.5; 73/865.8

(58) Field of Classification Search
USPC ............................ 73/866.5, 865.8
See application file for complete search history.

(56) References Cited

U.S. PATENT DOCUMENTS

| | | |
|---|---|---|
| 2,030,840 A | 2/1936 | Allen |
| 2,596,322 A | 5/1952 | Zumwait |
| 2,694,164 A | 11/1954 | Geppelt |
| 2,908,161 A * | 10/1959 | Bincer ............................ 73/622 |
| 3,105,380 A | 10/1963 | Stebbins |
| 3,404,281 A | 10/1968 | Fengler |
| 3,602,036 A * | 8/1971 | Peterson ........................ 73/633 |
| 3,609,612 A | 9/1971 | Tibbling |
| 3,682,265 A | 8/1972 | Hiraoka et al. |
| 3,690,393 A | 9/1972 | Guy |

(Continued)

FOREIGN PATENT DOCUMENTS

| | | |
|---|---|---|
| FR | 861432 | 2/1941 |
| FR | 2 689 479 | 10/1993 |

(Continued)

OTHER PUBLICATIONS

NDT. "Family of ultrasonic scanners for detector". Available at http://www.ndt.com.ua/eng/tools_3_article.html at least as early as Feb. 2008.

(Continued)

*Primary Examiner* — Hezron E Williams
*Assistant Examiner* — Nashmiya Fayyaz
(74) *Attorney, Agent, or Firm* — Davis & Bujold, PLLC; Michael J. Bujold

(57) ABSTRACT

There is provided a modular scanner and probe holding apparatus for inspection, which consists of an assembly of a plurality of connective links rigidly connected. The connective links are added or removed from the assembly to size the assembly so the assembly extends more than halfway around a circumference of a tubular body to be inspected. At least one tail link is connected to an end of the assembly. The tail link is biased by a spring to apply a force against the tubular body to hold the assembly in place. A probe holder link is provided that connects to the connective links and has a probe holder for holding a probe.

17 Claims, 5 Drawing Sheets

(56) References Cited

U.S. PATENT DOCUMENTS

| | | |
|---|---|---|
| 3,719,395 A | 3/1973 | Mulasmajic |
| 3,734,565 A | 5/1973 | Mulasmajic |
| 3,764,777 A | 10/1973 | Sakabe et al. |
| 3,777,834 A | 12/1973 | Hiraoka et al. |
| 3,810,515 A | 5/1974 | Ingro |
| 3,844,164 A | 10/1974 | Romere |
| 3,988,922 A | 11/1976 | Clark et al. |
| 3,999,423 A | 12/1976 | Tyree |
| 4,010,636 A | 3/1977 | Clark et al. |
| 4,029,164 A | 6/1977 | Urakami |
| 4,457,382 A | 7/1984 | Tolanda |
| 4,573,549 A | 3/1986 | Pankow |
| 4,872,355 A | 10/1989 | Rohrberg et al. |
| 4,890,567 A | 1/1990 | Caduff |
| 4,941,095 A | 7/1990 | Imaseki et al. |
| 4,995,320 A | 2/1991 | Sato et al. |
| 5,065,835 A | 11/1991 | Richter et al. |
| 5,213,177 A | 5/1993 | May |
| 5,220,869 A | 6/1993 | Pelrine et al. |
| 5,343,974 A | 9/1994 | Rabek |
| 5,350,033 A | 9/1994 | Kraft |
| 5,355,807 A | 10/1994 | Pelrine et al. |
| 5,388,528 A | 2/1995 | Pelrine et al. |
| 5,407,023 A | 4/1995 | Yamashita et al. |
| 5,429,428 A | 7/1995 | Yasuda |
| 5,473,953 A | 12/1995 | Appel |
| 5,535,124 A | 7/1996 | Hosseini et al. |
| 5,544,950 A | 8/1996 | Burg et al. |
| 5,564,800 A | 10/1996 | Fischle et al. |
| 5,619,423 A | 4/1997 | Scrantz |
| 5,628,271 A | 5/1997 | McGuire |
| 5,698,799 A | 12/1997 | Lee, Jr. et al. |
| 5,819,863 A | 10/1998 | Zollinger et al. |
| 5,821,405 A | 10/1998 | Dickey et al. |
| 5,892,360 A | 4/1999 | Willer et al. |
| 6,000,484 A | 12/1999 | Zoretich et al. |
| 6,079,286 A | 6/2000 | Struble |
| 6,125,955 A | 10/2000 | Zoretich et al. |
| 6,251,073 B1 | 6/2001 | Imran et al. |
| 6,283,237 B1 | 9/2001 | Muller |
| 6,425,340 B1 | 7/2002 | McGuire |
| 6,554,084 B1 | 4/2003 | Enmeiji |
| 6,631,320 B1 | 10/2003 | Holt |
| 6,655,223 B2 | 12/2003 | March et al. |
| 6,672,413 B2 | 1/2004 | Moore et al. |
| 6,691,016 B1 | 2/2004 | Sommer |
| 6,823,718 B2 | 11/2004 | Sandford et al. |
| 6,840,266 B2 | 1/2005 | Beck et al. |
| 7,181,968 B2 | 2/2007 | Still |
| 7,383,691 B2 | 6/2008 | Felcman et al. |
| 8,141,442 B2 * | 3/2012 | Roberts .................. 73/865.8 |
| 2002/0069700 A1 | 6/2002 | Dirmeyer et al. |
| 2003/0070862 A1 | 4/2003 | Tartara |
| 2009/0025490 A1 * | 1/2009 | Brandstrom ............. 73/865.9 |
| 2009/0038398 A1 * | 2/2009 | Lavoie et al. .................. 73/637 |
| 2009/0145249 A1 * | 6/2009 | Dubbeldam et al. ......... 73/866.5 |
| 2009/0314089 A1 | 12/2009 | Brignac et al. |
| 2012/0204645 A1 * | 8/2012 | Crumpton et al. ............... 73/588 |

FOREIGN PATENT DOCUMENTS

| | | |
|---|---|---|
| GB | 150052 | 8/1920 |
| GB | 254654 | 7/1926 |
| GB | 467264 | 6/1937 |
| JP | 59 230 872 | 12/1984 |
| JP | 60 008 169 | 1/1985 |
| JP | 60 092 176 | 5/1985 |
| JP | 62 139 769 | 6/1987 |
| JP | 62 268 782 | 11/1987 |
| JP | 6 206 581 | 7/1994 |

OTHER PUBLICATIONS

Eclipse Scientific WECLIP brochure. Available at http://www.eclipsescientific.com/products/Scanning/WECLIP/EclipseWECLIP.pdf as early as May 2001.

Automated Inspection Systems. Inc. "Manual Pipe Scanner". Available at htt://www.ais4ndt.com/scanners_pipe.html. Accessed Mar. 23, 2010. Available as early as 2004.

\* cited by examiner

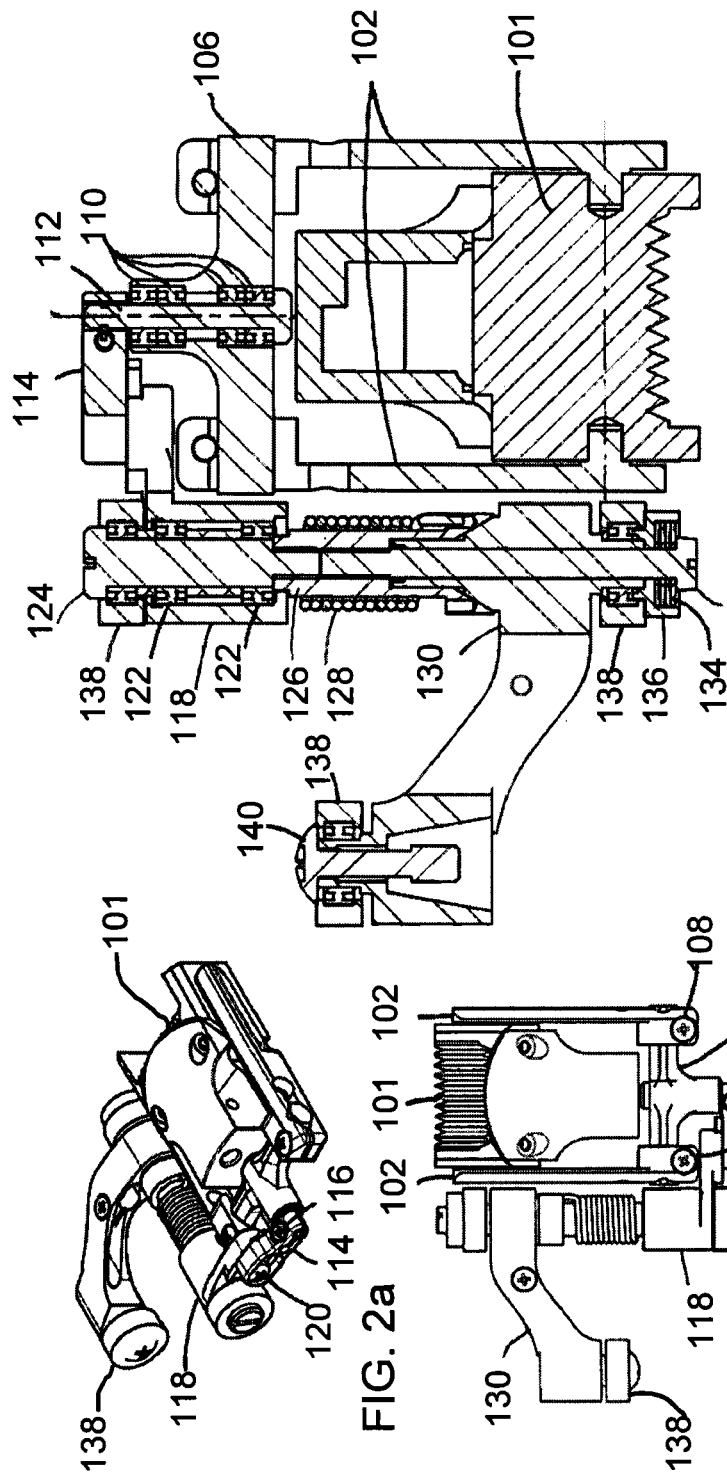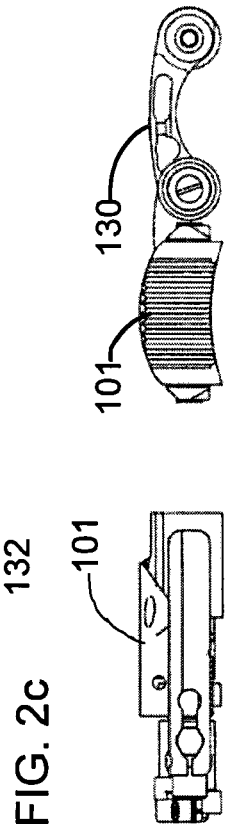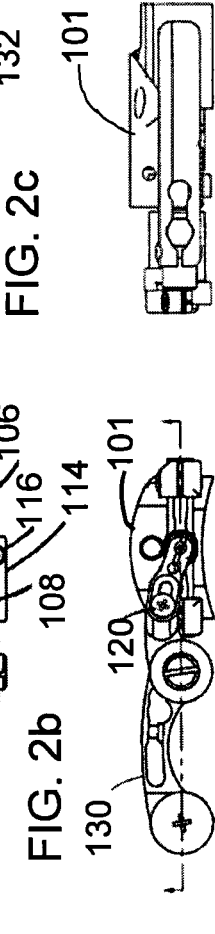

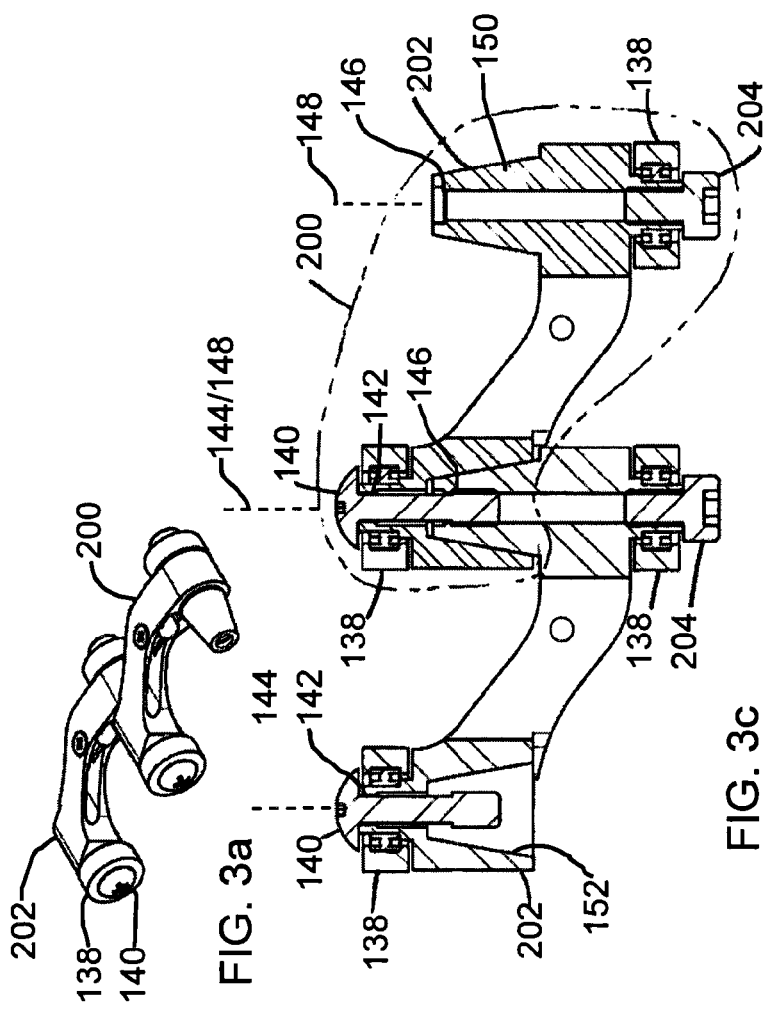

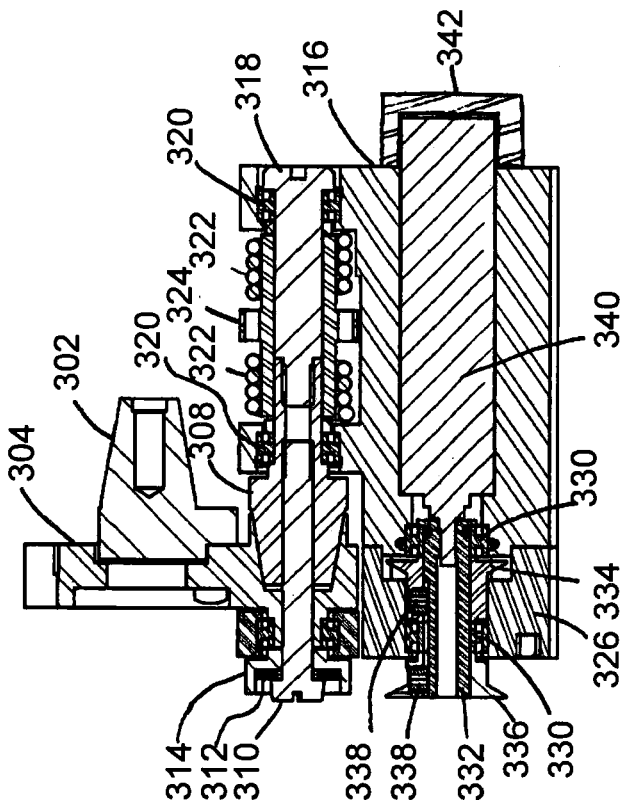
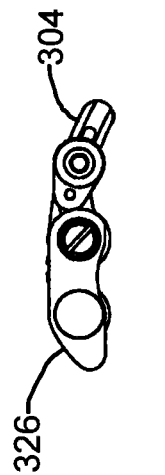
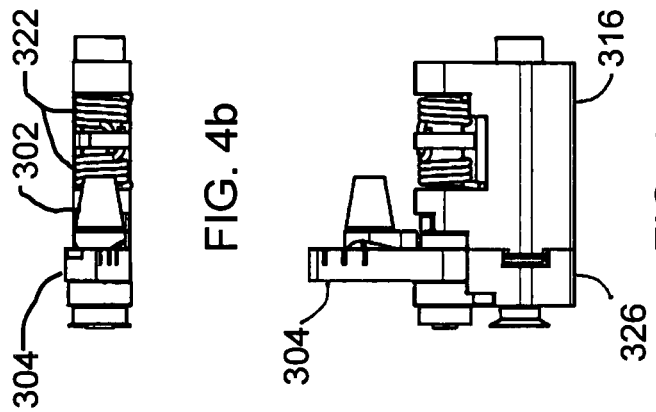
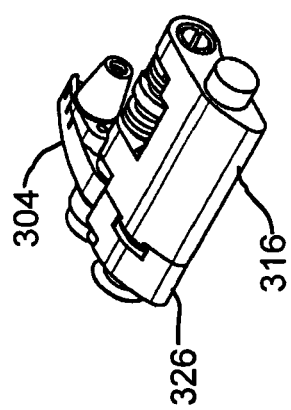
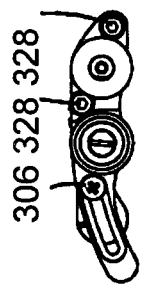

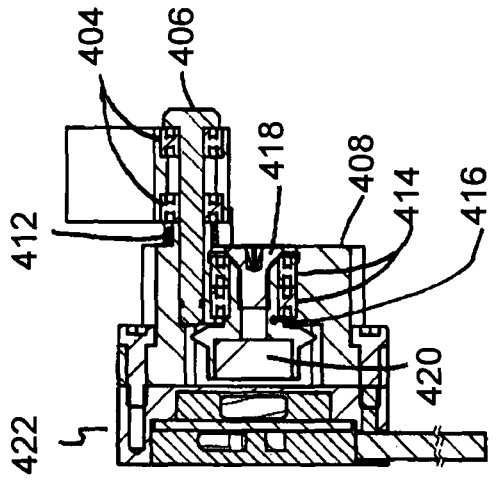
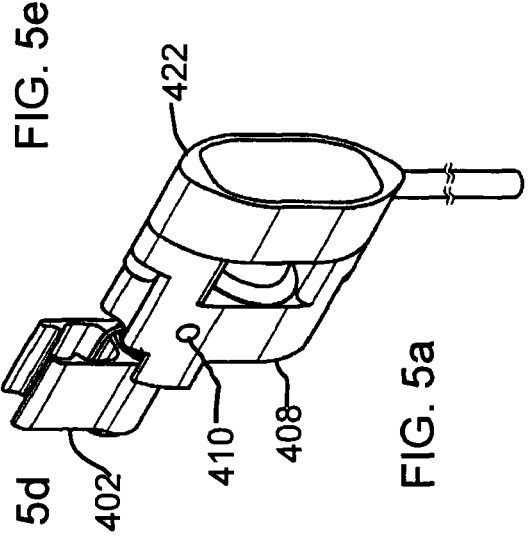
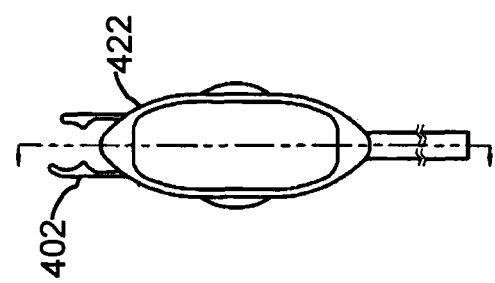
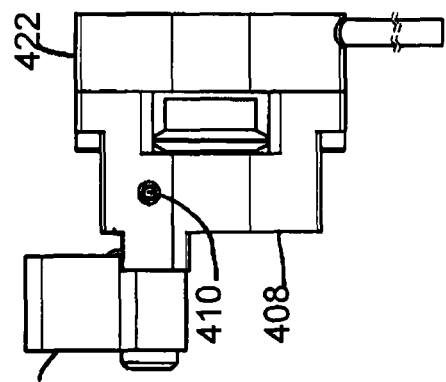
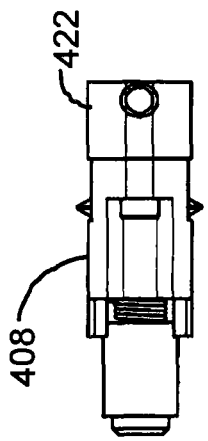
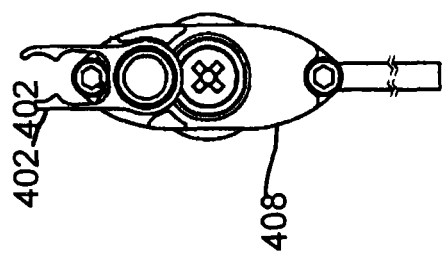

MODULAR SCANNER APPARATUS AND PROBE HOLDING APPARATUS FOR INSPECTION

FIELD

There is described a modular scanner and probe holding apparatus for use in industrial piping inspections.

BACKGROUND

In industrial piping environments, there are many situations where defects in materials and/or the welds of the materials must be detected to ensure quality control. The defects may be internal flaws such as cracks, voids, etc. produced during the manufacturing of the material, flaws in the area of a weld due to inadequate welding preparation and/or practice, or surface irregularities due to, in most cases, corrosion.

A preferred method for detecting these flaws is called non-destructive testing, or inspection. In non-destructive testing, flaws are detected by various methods such as ultrasonic, x-ray, magnetic particle and electro-magnetic. Historically the majority of pipe or tube inspection has been done by x-ray. More recently ultrasonic methods are being used.

The key problem with x-ray inspection is the hazards associated with handling radioactive materials and equipment. The entire work area must be flagged and vacated during inspection which often causes job delays. Conventional Ultrasonic equipment does not require the work area to be vacated but is often too bulky to be used in applications with tight space requirements. Many chemical plants, refineries, and nuclear plants often have piping and tubing spaced closely together. Emerging ultrasonic phased array technology has now made it possible to use ultrasonic inspection in these tight applications. Conventional scanning hardware on the market is too large and bulky to be used in many of the piping and tube application where space is limited. This leaves the operator no choice but to translate the probe along the material's surface by hand.

SUMMARY

There is provided a modular scanner apparatus and probe holding apparatus for inspection, which consists of an assembly of a plurality of connective links rigidly connected.

The connective links are added or removed from the assembly to size the assembly so the assembly extends more than half way around a circumference of a tubular body to be inspected. At least one tail link is connected to an end of the assembly. The tail link is biased by a spring to apply a force against the tubular body to hold the assembly in place. A probe holder link is provided that connects to the connective links and has a probe holder for holding a probe.

The modular scanner, as described above, is readily adjustable to fit different sizes of pipes or tubes. Previously, there was a need to carry different sizes of assemblies to fit different sizes.

It is preferred that each of connective links have wheels, which allow the assembly to travel circumferentially around piping and tubing. The assembly has a low profile design enabling inspection of piping and tubing with small radial clearance.

Although beneficial results may be obtained just by using the probe, even more beneficial results may be obtained by including an encoder link which connects to the connective links and houses an encoder. The encoder link can be combined with one of the tail links.

The connective links can take different forms. However, the preferred form of connective link has a first pivot pin receiver having a first axis, a second pivot pin receiver having a second axis and a rigid connective portion that extends between and connects the first pivot pin receiver and the second pivot pin receiver. The first pivot pin receiver is offset from the second pivot pin receiver with the first pivot pin axially spaced along the first axis in a first direction and the second pivot pin axially spaced along the second axis in a second direction opposed to the first direction.

There are different ways in which the connective links can be made rigid. Beneficial results may be obtained when the mating interface between two connective links consists of a cone shaped male portion on one of the connective links and a cone shaped female portion on another of the connective links. When the male portion and the female portion are mated and secured together with a rotatable fastener, the joint becomes rigid.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1a is a side elevation view of a scanner assembly.
FIG. 1b is a perspective view of the scanner assembly of FIG. 1a.
FIG. 2a is a perspective view of a probe holder assembly.
FIG. 2b is a top plan view of the probe holder assembly of FIG. 2a.
FIG. 2c is a detailed bottom plan view in section of the probe holder assembly of FIG. 2a.
FIG. 2d is a front elevation view of the probe holder assembly of FIG. 2a.
FIG. 2e is a side elevation view of the probe holder assembly of FIG. 2a.
FIG. 2f is a rear elevation view of the probe holder assembly of FIG. 2a.
FIG. 3a is a perspective view of a link assembly.
FIG. 3b is a top plan view of the link assembly of FIG. 3a.
FIG. 3c is a bottom plan view in section of the link assembly of FIG. 3a.
FIG. 3d is a side elevation view of the link assembly of FIG. 3a.
FIG. 3e is an end elevation view of the link assembly of FIG. 3a.
FIG. 4a is a perspective view of a tail link assembly.
FIG. 4b is a left side elevation view of the tail link assembly of FIG. 4a.
FIG. 4c is a top plan view of the tail link assembly of FIG. 4a.
FIG. 4d is a top plan view in section of the tail link assembly of FIG. 4a.
FIG. 4e is a front elevation view of the tail link assembly of FIG. 4a.
FIG. 4f is a right side elevation view of the tail link assembly of FIG. 4a.
FIG. 4g is a rear elevation view of the tail link assembly of FIG. 4a.
FIG. 5a is a perspective view of an encoder assembly.
FIG. 5b is a front elevation view of the encoder assembly of FIG. 5a.
FIG. 5c is a top plan view of the encoder assembly of FIG. 5a.

FIG. 5d is a rear elevation view of the encoder assembly of FIG. 5a.

FIG. 5e is a bottom plan view in section of the encoder assembly of FIG. 5a.

FIG. 5f is a side elevation view of the encoder assembly of FIG. 5a.

DETAILED DESCRIPTION

Figures 1A, 1B:
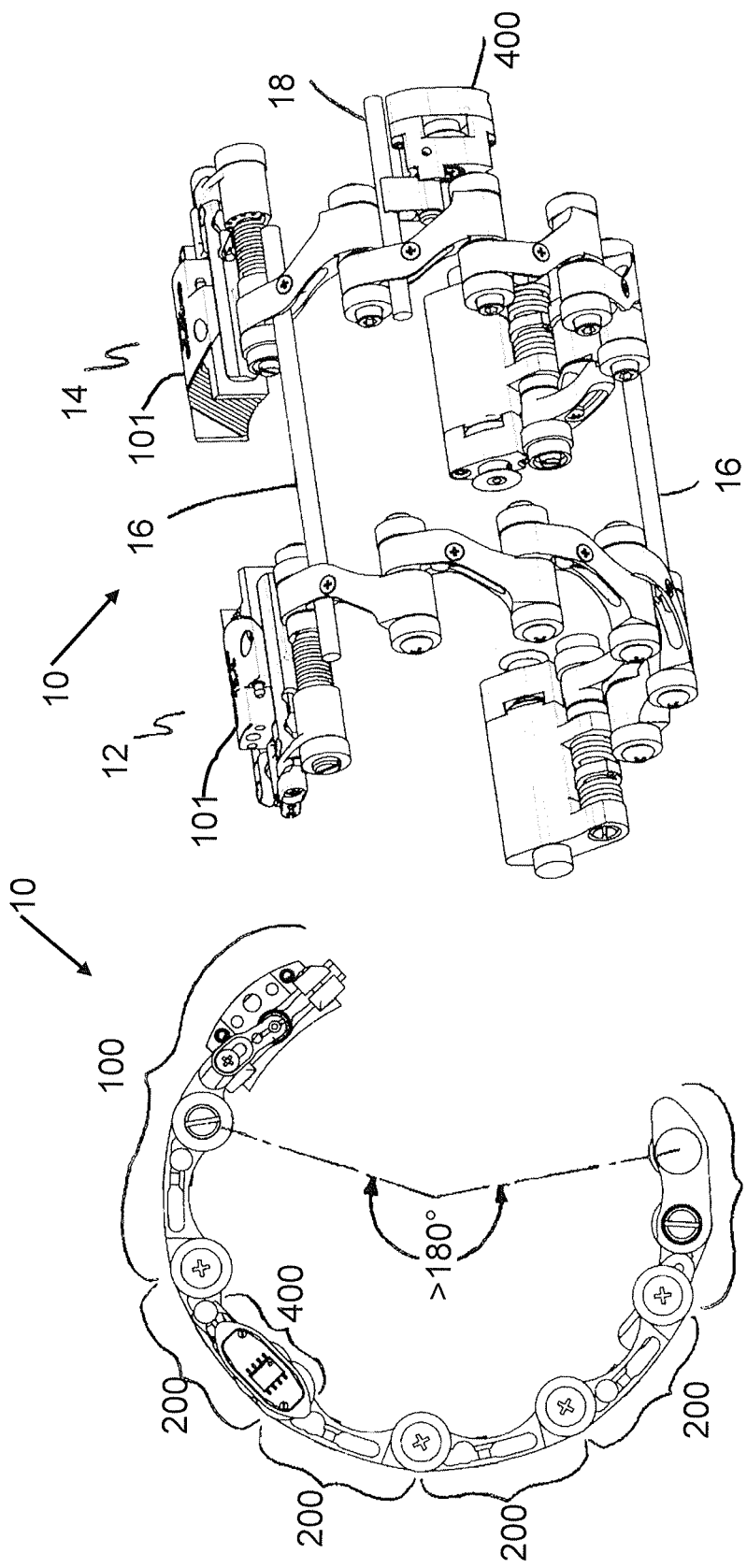

A modular scanner and probe holding apparatus, generally indicated by reference numeral 10, will now be described with reference to FIGS. 1a and 1b. The components making up the scanner apparatus will then be described with reference to the other figures.

Structure and Relationship of Parts:

Referring to FIGS. 1a and 1b, the scanner assembly 10 generally provides a means of translating an inspection probe, or probes, circumferentially around cylindrical pipe or tube while outputting positional data. The design is such that the user can quickly and easily configure the scanner 10 for different pipe/tube sizes. The scanner 10 can be assembled to translate either a pair of opposing probes or a single probe, should space be limited. Once configured, the scanner 10 is easily installed by hand simply by clipping it onto the pipe/tube.

In the depicted embodiment, the scanner 10 has a left hand assembly 12 and a right hand assembly 14. The two assemblies are conjoined with one or more bars 16. Each assembly consists of left or right hand versions of the same components, these being: a probe holder assembly 100, a link assembly 200, and a tail link assembly 300. One of the assemblies also requires an encoder assembly 400 which attaches to a short bar 18.

The scanner assembly 10 is configurable to suit different pipe/tube sizes by adding or removing link assemblies 200. The joints of the link assemblies 200, when loosened, are free to rotate and thus allow the scanner assembly 10 to conform to the outer diameter of the pipe/tube. Once the scanner assembly 10 is conformed to the outer diameter of the pipe/tube, the joints are tightened to form a rigid arc-shaped structure. The number of links 200 is chosen so that the wheels of the tail link assembly 300 wrap slightly more than 180 degrees around the outer diameter of the pipe/tube, as shown in FIG. 1a. The tail link assembly 300 is spring-loaded so that the scanner assembly 10 can be removed from the pipe or tube by hand. It also offers some adjustability to optimize the number of degrees over 180 that its wheels wrap. If the number of degrees over 180 is too large, the scanner assembly 10 will be too difficult to install/remove. If the number of degrees over 180 is too small, the scanner assembly 10 will not be positively retained on the pipe/tube. In effect, the scanner assembly 10 is a rigid arc-shaped structure with a flexible spring-loaded tail link assembly 300 which retains the scanner assembly 10 on the pipe/tube. The user first configures the scanner assembly 10 to the size of pipe/tube he wishes to scan and then installs it simply by clipping it onto the pipe/tube.

The probe holder assembly 100, link assembly 200, tail link assembly 300, and encoder assembly 400 are explained in detail below.

Referring to FIG. 2a through 2f, a preferred embodiment of a probe holder assembly, depicted generally by reference numeral 100, is depicted. Generally, it provides a means of holding an inspection probe in a manner that allows the probe's bottom face to remain in proper contact with the inspected material's surface. To do so, it must provide a force which causes the probe to contact the inspection surface. Also, it must provide two rotational degrees of freedom to ensure proper contact over any irregularities in the inspection surface.

In the depicted embodiment, the inspection probe 101 is held by inserting the small round bosses of the probe holder arms 102 into holes in the probe 101. The small round bosses are free to pivot within the probe holes, thus providing the first required rotational degree of freedom. The probe holder arms 102 slide along a cross bar 106 and are held in place by clamping screws 108. The center of the cross bar 106 houses a set of bearings 110 through which a pivot pin 112 is inserted. The bearings 110 and the pivot pin 112 provide the second required rotational degree of freedom. A sliding arm 114 is clamped to the end of the pivot pin 112 with a clamping screw 116. The sliding arm 114 and a swing arm 118 are fastened together with a screw 120 to form an adjustable length swing arm assembly. When the screw 120 is loosened, the sliding arm 114 is free to slide along the swing arm 118 such that the effective swing arm length may be shortened or extended slightly. For most tube sizes, the length of the swing arm 118 would be extended to the maximum. Only for the smallest tube sizes would the swing arm length be reduced, and solely for the purpose of providing clearance between the probe holder and the tail of the scanner since on small tubes the tail of the scanner wraps further around the tube. The swing arm 118 houses a set of bearings 122 through which a shoulder screw 124 is inserted. The bearings 122 and shoulder screw 124 provide an axis of rotation for the adjustable swing arm assembly to swing about. The shoulder screw 124 is threaded into a spindle 126 over which a torsion spring 128 is installed. One end of the torsion spring 128 is inserted into a small hole in the swing arm 118 so that it applies a torque on the swing arm 118. This torque, when translated through the swing arm assembly and other components, provides the force which causes the probe 101 to contact the inspection surface. The other end of the torsion spring 128 is inserted into a small hole in the spindle 126. Physical stops for both directions of rotation are preferably built into the swing arm 118 and the swing arm end of the spindle 126 in order to limit the range of rotational freedom of the swing arm assembly. The purpose of the stop that is acted upon by the torsion spring 128 is to reduce the annoyance of the probe 101 swinging further than required during setup and general handling of the scanner, while the stop in the opposite direction is required to prevent the user from over-rotating the swing arm assembly and thus damaging the torsion spring 128. The range of rotational freedom of the swing arm assembly is designed to be slightly larger than that required to install the scanner on the smallest tube, since the smallest tube requires the largest range of motion.

The spindle 126 is preferably fastened to a probe holder link 130 with a screw 132. A belleville spring stack 134 may be located under the head of the screw 132 and held concentric with a belleville spring retainer 136. The mating interface between the spindle 126 and the probe holder link 130 is cone shaped so that the joint operates like a cone-brake mechanism. The axial force clamping the two members together is directly related to the torque capacity of the joint. The clamping force of the screw 132, which is controlled by the amount of deflection of the belleville spring stack 134, may be factory set such that the joint is capable of holding more that the torque output of the torsion spring 128, but not more than what is easily overcome by hand. This limited-slip joint allows the user to easily reposition the range of rotational freedom of the swing arm without tools. This is beneficial since the spring-loaded probe can be rotated out of the way while the user configures the rest of the scanner.

Wheel assemblies 138 are located as shown and provide smooth rolling along the inspection surface. A self-captured screw 140 is retained in the probe holder link 130 and is used to attach the probe holder assembly 100 to the link assemblies 200, which form the structure of the scanner.

Referring to FIG. 3a through 3e, a preferred embodiment of the link assembly is identified in general by reference numeral 200. Two link assemblies 200 are shown connected together. The main component is the link 202 to which are attached two wheel assemblies 138. A screw 204 retains one of the wheel assemblies 138, and a self-captured screw 140 retains the other and holds the link assemblies 200 together. Each connective link has a first pivot pin receiver 142 having a first axis 144 and a second pivot pin receiver 146 having a second axis 148. The first pivot pin receiver 142 is offset from the second pivot pin receiver 146. The mating interface between the two link assemblies 200 is cone shaped with a male portion 150 and a female portion 152 so that the joint is rigid, without play, and capable of being tightened easily with one screw 140. Prior to making the joint rigid, the link 202 may be pivoted about the screws 140, which act as a pivot pin until tightened.
the first pivot pin receiver being offset from the second pivot pin receiver with the first pivot pin axially spaced along the first axis in a first direction and the second pivot pin axially spaced along the second axis in a second direction opposed to the first direction.

Referring to FIG. 4a through 4g, a preferred embodiment of the tail link assembly is identified in general by reference numeral 300. Generally, it is the final link in the scanner assembly and its purpose is to provide the retaining force which holds the scanner assembly 10 on the pipe/tube. It also provides an adjustment which allows the operator to optimize the degrees over 180 that the tail link assembly 300 wraps.

In the depicted preferred embodiment, it has a tapered mount 302 which assembles to the last link assembly 200 with a self-captured screw 140. An adjustable arm 304 is fastened to the tapered mount 302 with a screw 306. When the screw 306 is loosened, the user can slide the adjustable arm 304 relative to the tapered mount 302 so that the effective length of the arm may be lengthened or shortened. The adjustable arm 304 has a female taper feature into which a tapered spindle 308 is fastened with a screw 310. A belleville spring stack 312 is retained with a spring retainer 314 and is used to create a limited slip joint similar to the probe holder. The limited slip joint allows the user to adjust the position of the tail link assembly wheels by hand. It also protects the components of the tail link assembly 300 from the potentially damaging forces induced when the user installs the scanner assembly onto the pipe/tube. Rather than bend the weakest scanner components, the tail link assembly joint will simply slip until the required opening is achieved for passing over the largest portion of the pipe/tube.

As depicted, a swing block 316 is fastened to the tapered spindle 308 with a shoulder screw 318 and a set of bearings 320. Two torsion springs 322 are mounted on a mandrel 324 and apply a torque on the swing block 316. The mandrel 324 is keyed to the tapered spindle 308 so that the reaction torque is transmitted from the mandrel 324 to the tapered spindle 308. A wheel block assembly 326 is fastened to the swing block 316 with a pair of screws 328 and houses a set of bearings 330 through which a shaft 332 is inserted. An inner wheel 334 and outer wheel 336 are retained on the shaft with set screws 338. Although the scanner may be moved around the pipe/tube by hand, smoother and more controlled operation may be achieved with the addition of an optional motor 340, which may be inserted into the swing block 316 and retained with a cap 342. The shaft of the motor 340 is keyed together with the shaft 332 which would in turn rotate the inner wheel 334 and outer wheel 336, driving the scanner around the pipe/tube.

Referring to FIG. 5a through 5f, a preferred embodiment of the encoder assembly is identified in general by reference numeral 400. Generally, it is the component of the scanner which provides the positional data to the user. In the depicted embodiment, it clips onto a short bar 18 with a clip 402 which houses a bearing set 404 though which is inserted a pin 406. The pin 406 is retained in a housing block 408 with a set screw 410. A torsion spring 412 exerts a torque on the housing block 408 relative to the clip 402 so that when the encoder assembly 400 is installed on the scanner assembly 10, the wheel of the encoder assembly is held in constant contact with the inspection surface. Portions of the housing block 408 extend towards and overlap the clip 402 to limit the relative rotation between the clip 402 and the housing block 408. The housing block 408 houses a bearing set 414, through which is inserted a wheel shaft 416. A screw 418 retains the wheel shaft 416 within the bearings 414. A diametrically magnetized magnet 420 is installed in the end of the wheel shaft 416 and provides a magnetic signal to the encoder module 422. The encoder module 422 decodes the magnetic signal and transmits it down its cable.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A modular scanner apparatus and probe holding apparatus for inspection, comprising:
   an assembly of a plurality of connective links rigidly connected by a series of couplings, each of the connective links selectively fixing the relative angular position of adjacent connective links to rigidly conform to a circumference of a tubular body to be inspected, the angular positions being rigidly fixed independently of the tubular body, connective links being added or removed from the assembly to size the assembly so the assembly extends more than halfway around the circumference of the tubular body, the assembly comprising at least one tail link connected to at least one end of the assembly, at least a portion of the tail link being biased by a torsion spring relative to the assembly toward an industrial pipe to hold the assembly in place; and
   a probe holder link that connects to the connective links and has a probe holder for holding a probe.

2. The modular scanner of claim 1, wherein an encoder link connects to the connective links and houses an encoder.

3. The modular scanner of claim 1, wherein each connective link has a wheel to facilitate rolling movement of the assembly around the circumference of the tubular body.

4. The modular scanner of claim 1, wherein each connective link comprises:
   a first pivot pin receiver having a first axis;
   a second pivot pin receiver having a second axis parallel to the first axis;
   a rigid connective portion that extends between and connects the first pivot pin receiver and the second pivot pin receiver, the first pivot pin receiver being offset from the second pivot pin receiver with a first pivot pin axially spaced along the first axis in a first direction and a second pivot pin axially spaced along the second axis in a second direction opposed to the first direction, wherein the couplings selectively fix adjacent connective links in the relative angular position about the first axis and the second axis.

5. The modular scanner of claim 1, wherein the coupling between two connective links comprising a cone shaped male portion on one of the connective links and a cone shaped female portion on another of the connective links, when the male portion and the female portion are mated and secured together with a rotatable fastener, the coupling becomes rigid.

6. The modular scanner of claim 2, wherein the encoder link is combined with one of the at least one tail link.

7. The modular scanner of claim 1, wherein the assembly comprises tail links at either end of the assembly, the tail links having a first end and a second end, the tail links being connected to the assembly only at the first end.

8. The modular scanner of claim 1, wherein the connective links are rigidly connected in a selected pivotal position prior to installation on the industrial pipe such that the connective links are rigidly connected in a semi-circular shape.

9. A method of scanning an industrial pipe, comprising the steps of:
   providing an assembly of a plurality of connective links and at least one tail link, the plurality of connective links being rigidly connected by a series of couplings, each of the connective links selectively fixing the relative angular position of adjacent connective links to rigidly conform to a circumference of a tubular body to be inspected, the angular positions being rigidly fixed independently of the tubular body;
   preparing the assembly for installation on an industrial pipe to be scanned by adding or removing connective links to the assembly to size the assembly so that the assembly extends more than half way around the circumference of the tubular body, the at least one tail link being connected to at least one end of the assembly, at least a portion of the tail link being biased by a torsion spring relative to the assembly toward the industrial pipe to hold the assembly in place;
   connecting a probe holder to the connective links that has a probe holder that holds a probe;
   installing the assembly on the industrial pipe by:
      causing the tail link to bias outward from the assembly;
      placing the assembly around the industrial pipe; and
      biasing, with the torsion spring, the portion of the tail link relative to the assembly toward the industrial pipe to hold the assembly in place;
   rotating the assembly about the industrial pipe while operating the probe.

10. The method of claim 9, wherein an encoder link connects to the connective links and houses an encoder.

11. The method of claim 9, wherein each of the connective links has a wheel to facilitate rolling movement of the assembly around the circumference of the tubular body.

12. The method of claim 9, wherein each of the connective links comprises:
   a first pivot pin receiver having a first axis;
   a second pivot pin receiver having a second axis parallel to the first axis;
   a rigid connective portion that extends between and connects the first pivot pin receiver and the second pivot pin receiver, the first pivot pin receiver being offset from the second pivot pin receiver with a first pivot pin axially spaced along the first axis in a first direction and a second pivot pin axially spaced along the second axis in a second direction opposed to the first direction.

13. The method of claim 9, wherein the coupling between two of the connective links comprises a cone shaped male portion on one of the connective links and a cone shaped female portion on another of the connective links, when the male portion and the female portion are mated and secured together with a rotatable fastener, the coupling becomes rigid.

14. The method of claim 10, wherein the encoder link is combined with one of the at least one tail link.

15. The method of claim 9, wherein the assembly comprises tail links at either end of the assembly, the tail links being connected only indirectly via the connective links.

16. The method of claim 9, wherein the connective links are rigidly connected prior to installation of the assembly on the industrial pipe.

17. A modular scanner apparatus and probe holding apparatus for inspection of a tubular body, the modular scanner comprising:
   an assembly of a plurality of connective links rigidly connected by a series of couplings, each of the connective links selectively fixing the relative angular position of adjacent connective links to rigidly conform to a circumference of a tubular body to be inspected, the angular positions being rigidly fixed independently of the tubular body, connective links being added or removed from the assembly to size the assembly so the assembly extends more than half way around a circumference of a tubular body to be inspected, the assembly comprising at least one tail link connected at an end of the assembly, the connection between the tail link and the end of the assembly defines a pivot axis, a spring communicates with the tail link and the end of the assembly and applies a force against the tail link so as to pivot the tail link about the pivot axis with respect to the end of the assembly, the tail link being pivoted toward the tubular body to hold the assembly in place;
   a probe holder link that connects to the connective links and has a probe holder for holding a probe; and
   the tail link comprises an arm and a swing block, the arm is rigidly connectable to the end of the assembly, the swing block is connected to the arm such that the swing block is pivotable about an axis with respect to the arm, the spring comprising a torsion spring and applying a force to the arm and the swing block and biases the swing block to pivot about the axis with respect to the arm toward the tubular body so as to hold the assembly on the tubular body.

* * * * *